United States Patent
Kondo et al.

(10) Patent No.: US 9,525,614 B2
(45) Date of Patent: Dec. 20, 2016

(54) COMMUNICATION SYSTEM AND COMMUNICATION METHOD

(71) Applicant: FUJITSU LIMITED, Kawasaki-shi (JP)

(72) Inventors: Taiji Kondo, Chiba (JP); Takao Ito, Kawasaki (JP); Hiroaki Kawasumi, Tokyo (JP); Takahiro Koharagi, Tokyo (JP); Katsumi Kobayashi, Tokyo (JP); Kobun Nakajima, Tokyo (JP); Satoshi Kurosawa, Tokyo (JP); Shigemasa Matsubara, Tokyo (JP); Yoshihiko Shirokura, Tokyo (JP)

(73) Assignee: FUJITSU LIMITED, Kawasaki (JP)

( * ) Notice: Subject to any disclaimer, the term of this patent is extended or adjusted under 35 U.S.C. 154(b) by 183 days.

(21) Appl. No.: 14/474,690

(22) Filed: Sep. 2, 2014

(65) Prior Publication Data
US 2014/0369236 A1    Dec. 18, 2014

Related U.S. Application Data

(63) Continuation of application No. PCT/JP2013/055751, filed on Mar. 1, 2013.

(30) Foreign Application Priority Data

Mar. 5, 2012   (JP) .................. 2012-048564

(51) Int. Cl.
*H04L 12/751* (2013.01)
*H04W 40/12* (2009.01)
(Continued)

(52) U.S. Cl.
CPC ............... *H04L 45/02* (2013.01); *H04L 41/12* (2013.01); *H04W 40/12* (2013.01); *H04W 84/18* (2013.01); *H04W 84/22* (2013.01)

(58) Field of Classification Search
None
See application file for complete search history.

(56) References Cited

U.S. PATENT DOCUMENTS

| | | | |
|---|---|---|---|
| 7,130,304 B1 * | 10/2006 | Aggarwal | H04L 45/00 370/389 |
| 7,860,104 B1 * | 12/2010 | Aggarwal | 370/395.3 |

(Continued)

FOREIGN PATENT DOCUMENTS

| | | |
|---|---|---|
| JP | 2010-178145 | 8/2010 |
| JP | 2011-97458 | 5/2011 |

OTHER PUBLICATIONS

Nozaki et al., "Evaluation and development of the reliable routing schemes for 950MHz band on large-scale wireless sensor networks", *IEICE Technical Report*, Oct. 2010, pp. 15-20, vol. 110, No. 254, Ubiquitous Sensor Network.

(Continued)

*Primary Examiner* — Jenee Williams
(74) *Attorney, Agent, or Firm* — Staas & Halsey LLP (57) ABSTRACT

A communication system includes: a specific node; and a plurality of nodes that are installed at fixed positions and perform ad hoc wireless communication with the specific node. The nodes each include a link quality evaluating unit, an upstream route constructing unit, a communicating unit, and a downstream route constructing unit. The link quality evaluating unit performs route evaluation using a hello frame based only on a track record of reception of the hello frame in order to perform upstream communication toward the specific node to form a network. The upstream route constructing unit constructs an upstream route based on the route evaluation. The communicating unit performs upstream communication toward the specific node on a regular basis with a predetermined frequency. The downstream route constructing unit constructs a downstream (Continued)

route from the specific node based on a route in the upstream communication toward the specific node.

3 Claims, 10 Drawing Sheets

(51) Int. Cl.
*H04L 12/24* (2006.01)
*H04W 84/18* (2009.01)
*H04W 84/22* (2009.01)

(56) References Cited

U.S. PATENT DOCUMENTS

| | | | |
|---|---|---|---|
| 8,953,605 B1* | 2/2015 | Mehra | H04L 45/58 370/392 |
| 2002/0133534 A1* | 9/2002 | Forslow | H04L 12/4641 709/200 |
| 2004/0018839 A1* | 1/2004 | Andric | H04L 12/2856 455/433 |
| 2005/0078672 A1* | 4/2005 | Caliskan | H04L 45/42 370/389 |
| 2005/0157741 A1* | 7/2005 | Wu | H04L 12/185 370/432 |
| 2005/0201409 A1* | 9/2005 | Griswold | H04L 12/437 370/445 |
| 2006/0013126 A1* | 1/2006 | Yasuoka | H04L 12/4633 370/217 |
| 2006/0114881 A1* | 6/2006 | Chari | H04L 45/125 370/351 |
| 2007/0091891 A1* | 4/2007 | Zwiebel | H04L 45/16 370/390 |
| 2007/0195702 A1* | 8/2007 | Yuen | H04L 45/121 370/238 |
| 2007/0201393 A1* | 8/2007 | Srikrishna | H04W 52/286 370/318 |
| 2007/0274268 A1* | 11/2007 | Axelsson | H04L 45/00 370/338 |
| 2007/0274272 A1* | 11/2007 | Joshi | H04L 1/0001 370/338 |
| 2008/0051036 A1* | 2/2008 | Vaswani | H04L 45/20 455/69 |
| 2008/0062945 A1* | 3/2008 | Ahuja | H04W 8/005 370/342 |
| 2008/0112371 A1* | 5/2008 | Joshi | H04L 12/66 370/337 |
| 2008/0247408 A1* | 10/2008 | Yoon | H04L 1/1657 370/408 |
| 2009/0003232 A1* | 1/2009 | Vaswani | H04L 45/00 370/252 |
| 2009/0031398 A1* | 1/2009 | Zheng | H04W 12/06 726/3 |
| 2009/0252065 A1* | 10/2009 | Zhang | H04L 41/082 370/256 |
| 2010/0195560 A1 | 8/2010 | Nozaki et al. | |
| 2010/0284414 A1* | 11/2010 | Agarwal | H04L 49/351 370/401 |
| 2011/0134854 A1* | 6/2011 | Hong | H04W 8/005 370/329 |
| 2011/0170443 A1* | 7/2011 | Murias | H04W 40/28 370/252 |
| 2011/0286450 A1* | 11/2011 | Wijnands | H04L 45/04 370/390 |
| 2013/0089011 A1* | 4/2013 | Alapuranen | H04L 5/1484 370/294 |
| 2013/0163514 A1* | 6/2013 | Ikemoto | H04L 45/54 370/328 |
| 2013/0229911 A1* | 9/2013 | Nagata | H04W 40/02 370/228 |
| 2013/0322231 A1* | 12/2013 | Csaszar | H04L 45/16 370/217 |

OTHER PUBLICATIONS

International Search Report mailed Mar. 26, 2013, in corresponding International Patent Application No. PCT/JP2013/055751.

* cited by examiner

COMMUNICATION SYSTEM AND COMMUNICATION METHOD

CROSS-REFERENCE TO RELATED APPLICATIONS

This application is a continuation of International Application No. PCT/JP2013/055751 filed on Mar. 1, 2013 which claims the benefit of priority of the prior Japanese Patent Application No. 2012-048564, filed on Mar. 5, 2012, the entire contents of which are incorporated herein by reference.

FIELD

The embodiments discussed herein are related to a communication system and a communication method.

BACKGROUND

An ad hoc communication scheme in which communication nodes directly communicate with each other has been used as a scheme for communication among a plurality of terminals. A proactive scheme and a reactive scheme are known as systems to construct routes in ad hoc communication.

In the proactive scheme, each node on a network bidirectionally communicates using a hello frame (exchanges a hello frame) with the adjacent node to notify the adjacent node of its own existence and recognize the existence of the adjacent node. A link can be established at a point when both adjacent nodes become able to manage each other by exchanging their hello frames. The hello frames are exchanged in regular one-hop broadcast. The nodes on a network each exchange hello frames including route information to the destination node, whereby routes are constructed between the transmission source node and the destination node (gateway node, for example).

Figure 11:
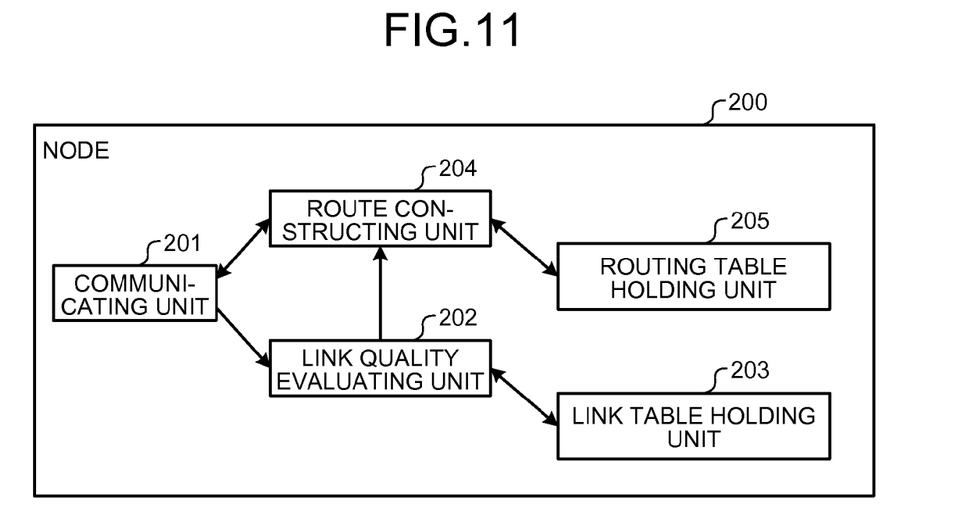
FIG. 11 is a block diagram illustrating a configuration of a node that performs communication in a proactive scheme, in the related art.

FIG. 11 is a block diagram illustrating a configuration of a node 200 that performs communication in a proactive scheme, in the related technique. The node 200 includes a communicating unit 201, a link quality evaluating unit 202, a link table holding unit 203, a route constructing unit 204, and a routing table holding unit 205.

The communicating unit 201 performs wired or wireless communication with nodes external to the node 200. The link quality evaluating unit 202 creates a link table from quality information of hello frames received at the communicating unit 201 and outputs the link table to the link table holding unit 203 as well as outputting information on the link quality to the route constructing unit 204. The link table holding unit 203 holds, as a table, link information of each node that is created by the link quality evaluating unit 202, based on the quality information of the hello frames received at the communicating unit 201. The route constructing unit 204 constructs routes based on the information on the link quality input from the link quality evaluating unit 202, creates route information for each target node, and outputs it to the routing table holding unit 205. The routing table holding unit 205 holds, as a table, route information output from the route constructing unit 204.

By contrast, a reactive scheme is a system to perform routing when a data transmission source node transmits data. In the reactive scheme, the transmission source node searches for an optimal route immediately before routing, whereby routes are constructed. In the route construction in the reactive scheme, each node on a network broadcasts a frame called a route request (RREQ) to surrounding nodes in order to find an optimal route. When the RREQ reaches the target node (gateway node, for example), the node creates a route reply (RREP) frame and returns (unicasts) the RREP by following the route through which the RREQ has been transmitted. This constructs a bidirectional communication route between the transmission source node and the target node, and subsequently, data is transferred via the nodes on the communication route for transmission and reception.

In the aforementioned reactive scheme, an RREQ is broadcasted to construct a route. When route construction is performed on a plurality of nodes at the same time, a plurality of RREQs are broadcasted to connect each of the nodes. This may cause network congestions. The following technique is known as a technique to construct a route in an ad hoc network. When nodes each transfer a frame in the upstream direction, a table for route construction in the upstream direction is created based on a frame transfer cost value between the nodes. In addition to this, a routing table for the downstream direction is created and is utilized in communication in the downstream direction to reduce the communication volume in the route construction in downstream communication (Japanese Laid-open Patent Publication No. 2011-097458, for example).

In the configuration of an ad hoc network with a large number of nodes, it is important to form a network in which all nodes can communicate with the target destination by intercommunication among the nodes with reduced hardware resources (and with reduced costs in relation to these resources). In a proactive scheme, each node on a network can reduce the communication volume for the route construction by exchanging hello frames constantly, as compared with a reactive scheme. However, some arrangements of the nodes use a large amount of memory to hold a link table, in association with transmission and reception of hello packets. Depending on the arrangement of the nodes (the number of surrounding nodes), the amount of memory requested to hold the link table may exceed the amount of memory of the nodes.

Figure 12:
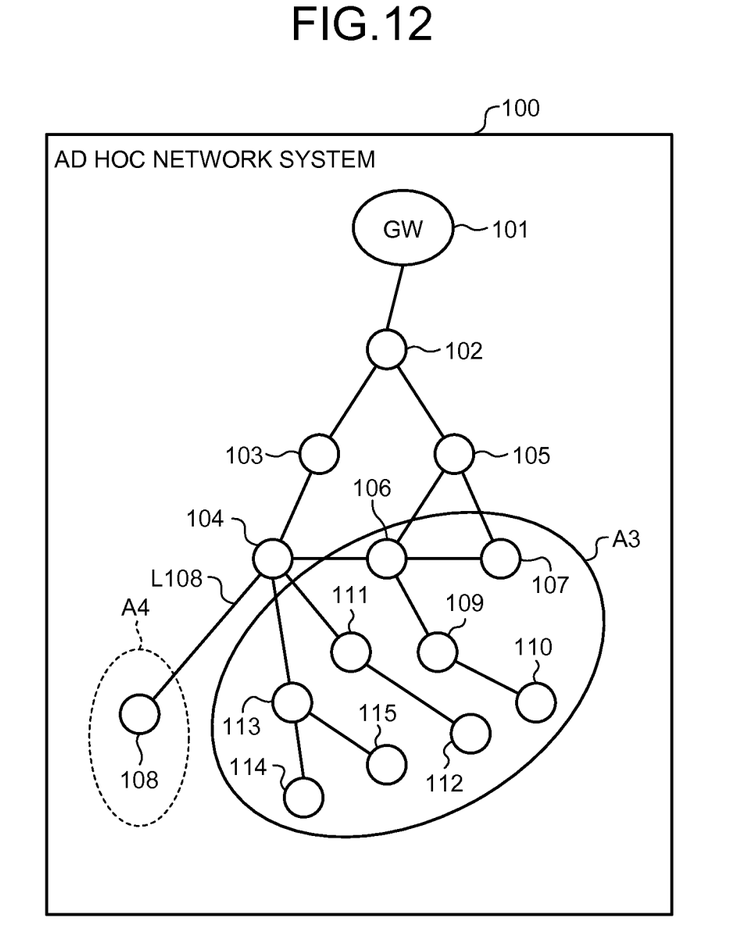
FIG. 12 is a schematic for illustrating an issue in a route construction in the related proactive scheme.

FIG. 12 is a schematic for illustrating an issue in a route construction in the related proactive scheme. In FIG. 12, a gateway (GW) node 101 and nodes 102 to 115 are directly or indirectly connected with each other to form an ad hoc network system 100. As illustrated in FIG. 12, the arrangement of the nodes in the ad hoc network system 100 is not uniform, and has a solid line area A3 in which the nodes are arranged with high density and a broken line area A4 in which the node is arranged with low density. This means that the ad hoc network system 100 includes a node (the node 104, for example) having a larger number of adjacent nodes and a node (the node 103 or the node 108, for example) having a smaller number of adjacent nodes.

In FIG. 12, each of the nodes exchanges hello frames to recognize the adjacent node. However, for example, the node 104 is adjacent to a total of five nodes and it is difficult for the node 104 to hold, in a link table, information of the hello frames from all of the adjacent nodes. In this case, the node 104 holds the information in the link table in the order of communication quality with the nodes.

As illustrated in FIG. 12, a link L108 is the only route from the node 108 to the node 104 and no alternative route exists. When the quality of the link L108 is not favorable, the node 108 may be absent from a link management list of the node 104 due to limitation of the amount of memory. For example, the node 104 exchanges hello frames with a plurality of surrounding nodes 106, 111, and 113 that belong to the solid line area A3. Due to the exchange, when the number of adjacent nodes to be managed by the node 104 exceeds the upper limit, no management on adjacent nodes through the exchange of hello frames is performed on the node 108. As a result, the node 104 fails to recognize the node 108 as an adjacent node. Although the node 108 can recognize the node 104, it is difficult for the link L108 between the node 104 and the node 108 to utilize as a communication route. The node 108 has no other routes except the route that passes through the node 104. Specifically, even when communication through the link L108 is possible, when the node 104 has a large number of adjacent nodes, the node 108 fails to utilize a route via the node 104 to be isolated.

SUMMARY

According to an aspect of the embodiments, a communication system includes: a specific node; and a plurality of nodes that are installed at fixed positions and perform ad hoc wireless communication with the specific node, wherein the nodes each include a link quality evaluating unit that performs route evaluation using a hello frame based only on a track record of reception of the hello frame in order to perform upstream communication toward the specific node to form a network, an upstream route constructing unit that constructs an upstream route based on the route evaluation by the link quality evaluating unit, a communicating unit that performs upstream communication toward the specific node on a regular basis with a predetermined frequency, and a downstream route constructing unit that constructs a downstream route from the specific node based on a route in the upstream communication toward the specific node.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. The descriptions in the embodiments below do not limit the communication system and the communication method disclosed in the present application.

Figure 1:
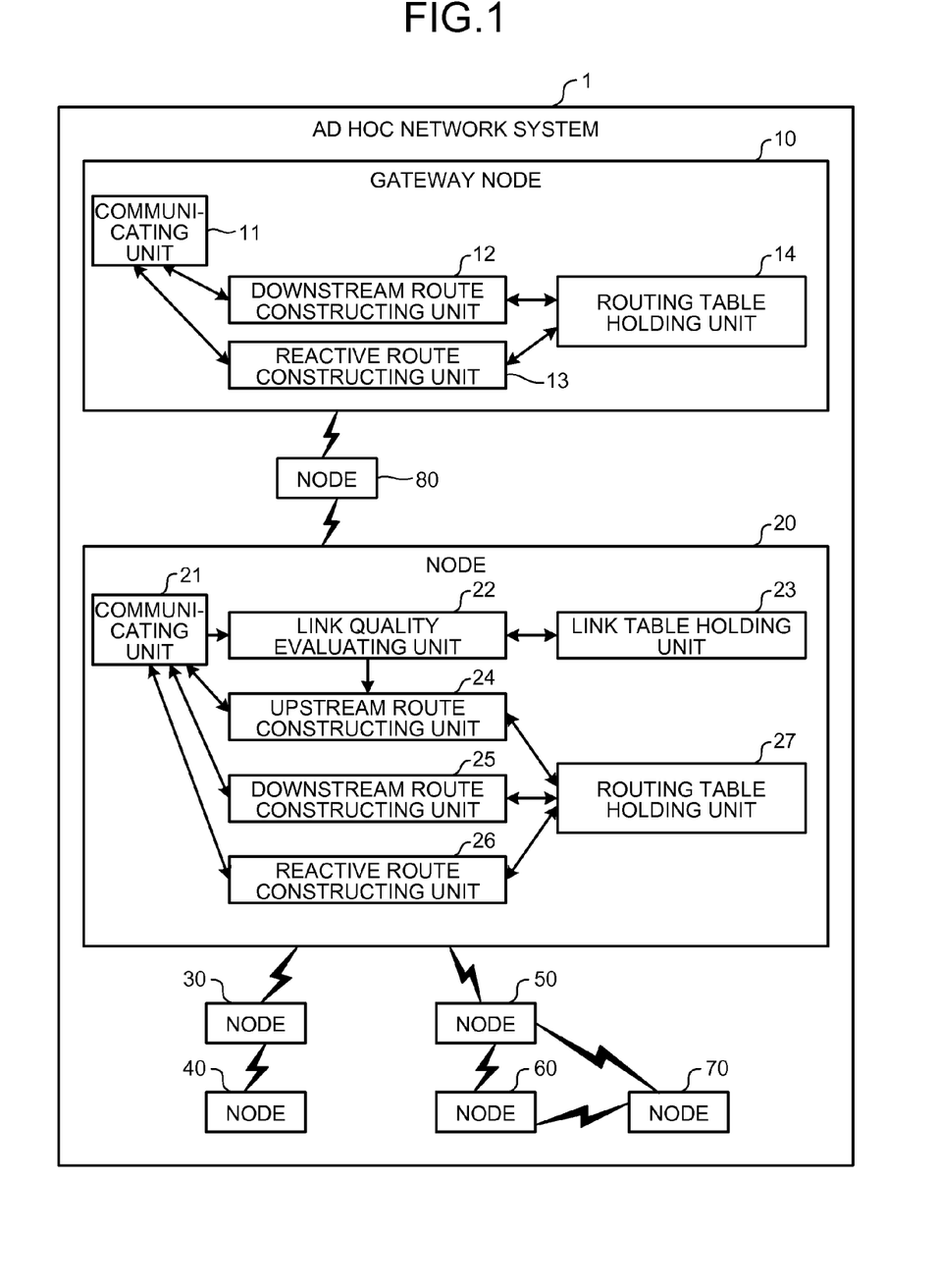
FIG. 1 is a block diagram illustrating a functional configuration of an ad hoc network system according to an embodiment of the present invention.

The configuration of an ad hoc network system 1 according to an embodiment disclosed in the present application is explained. FIG. 1 is a block diagram illustrating a functional configuration of the ad hoc network system 1 according to the embodiment of the present invention. As illustrated in FIG. 1, the ad hoc network system 1 includes a gateway node 10 and a plurality of nodes 20, 30, 40, 50, 60, 70, and 80 that are installed at fixed positions and perform ad hoc wireless communication with the gateway node 10. Hereinafter, frame transmission the destination of which is the gateway node 10 is defined as communication in the upstream direction (upstream communication) while frame transmission from the gateway node 10 to each of the nodes 20, 30, 40, 50, 60, 70, and 80 is defined as communication in the downstream direction (downstream communication).

In FIG. 1, the gateway node 10 includes a communicating unit 11, a downstream route constructing unit 12, a reactive route constructing unit 13, and a routing table holding unit 14. The node 20 includes a communicating unit 21, a link quality evaluating unit 22, a link table holding unit 23, an upstream route constructing unit 24, a downstream route constructing unit 25, a reactive route constructing unit 26, and a routing table holding unit 27.

The communicating unit 11 (or the communicating unit 21, the same shall apply hereinafter) performs wired or wireless communication with the nodes external to the gateway node 10 (node 20). The link quality evaluating unit 22 creates a link table from quality information of hello frame received at the communicating unit 21 and outputs the link table to the link table holding unit 23 as well as outputting information on the link quality to the upstream route constructing unit 24. The link table holding unit 23 holds, as a table, link information of each node that is created by the link quality evaluating unit 22, based on the quality information of the hello frames received at the communicating unit 21.

The upstream route constructing unit 24 constructs a route based on the information on the link quality input from the link quality evaluating unit 22, creates route information of each target node, and outputs the created route information to the routing table holding unit 27. The downstream route constructing unit 12 (25) constructs a downstream route with no redundancy for each target node based on the track record of the upstream communication and outputs it to the routing table holding unit 14 (27). The reactive route constructing unit 13 (26) performs a route search when the downstream route constructing unit 12 (25) has failed to communicate using the downstream route, and constructs another downstream route with redundancy to output it to the routing table holding unit 14 (27).

Figure 2:
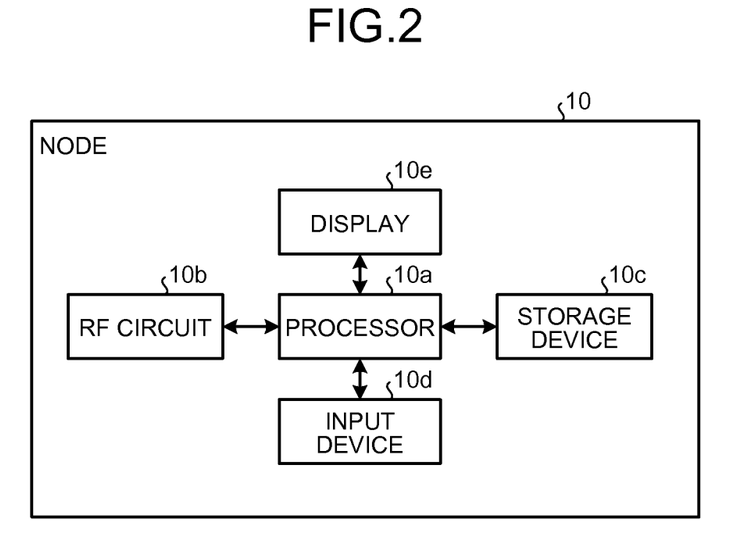
FIG. 2 is a block diagram illustrating a hardware configuration of a node according to the embodiment of the present invention.
Figure 3:
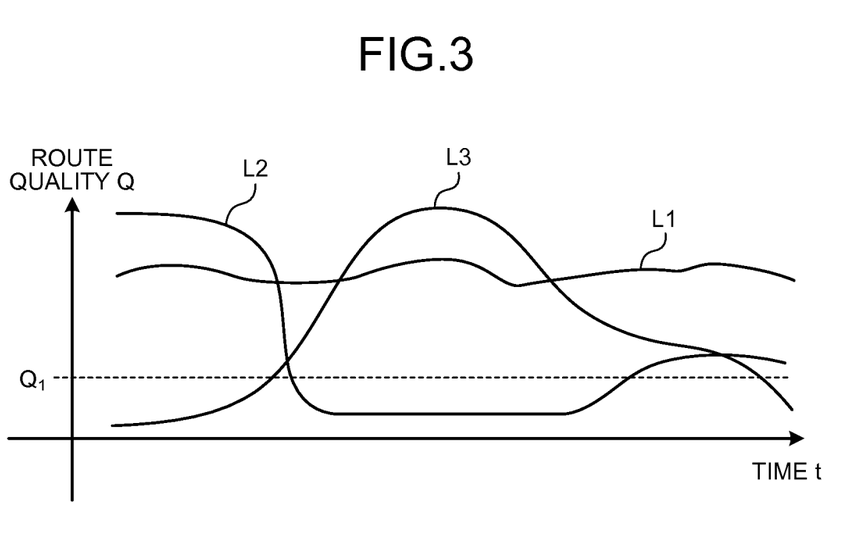
FIG. 3 is a graph illustrating time variation in route quality in the upstream direction and the downstream direction.

The following explains the hardware configurations of the gateway node 10 and the nodes 20 to 80. FIG. 2 is a block diagram illustrating the hardware configurations of the nodes 10 to 80 according to the embodiment of the present invention. The hardware configuration of the gateway node 10 will be representatively explained with reference to FIG. 2, and the other nodes 20 to 80 have similar hardware configurations. The common components shall be thus followed by reference numerals that end with the same letters, and the drawings and the detailed descriptions thereof are omitted.

As illustrated in FIG. 2, the node 10 includes a processor 10*a*, a radio frequency (RF) circuit 10*b*, a storage device 10*c*, an input device 10*d*, and a display 10*e* that are connected through a bus so that various signals and data can be input and output thereto. Examples of the processor 10*a* include a central processing unit (CPU) and a digital signal processor (DSP). Examples of the storage device 10*c* include, besides nonvolatile storage devices such as a hard disk (HD), a read only memory (ROM), and a flash memory, a random access memory (RAM) such as a synchronous dynamic random access memory (SDRAM). The input device 10*d* includes, for example, an operation key or a touch panel. The display 10*e* includes, for example, a liquid crystal display (LCD) or an electroluminescent display (ELD).

Among the functional components of the gateway node 10 as illustrated in FIG. 1, the communicating unit 11 is implemented by, for example, the RF circuit 10*b* as hardware. The downstream route constructing unit 12 and the reactive route constructing unit 13 are each implemented by the processor 10*a* as hardware. The routing table holding unit 14 is implemented by the storage device 10*c* as hardware.

Among the functional components of the node 20, the link quality evaluating unit 22, the upstream route constructing unit 24, the downstream route constructing unit 25, and the reactive route constructing unit 26 are each implemented by a processor 20*a*, and the communicating unit 21 is implemented by an RF circuit 20*b*. The link table holding unit 23 and the routing table holding unit 27 are implemented by the storage device 20*c* as hardware.

The following explains route control by an ad hoc network system 2 according to the embodiment of the present invention in detail with reference to FIGS. 3 to 10. Although the network topology of the ad hoc network system 2 differs from that of the aforementioned ad hoc network system 1, the configuration of, for example, the function and the hardware of each node is identical, and thus the explanation of the configuration of each node is omitted.

Figure 4:
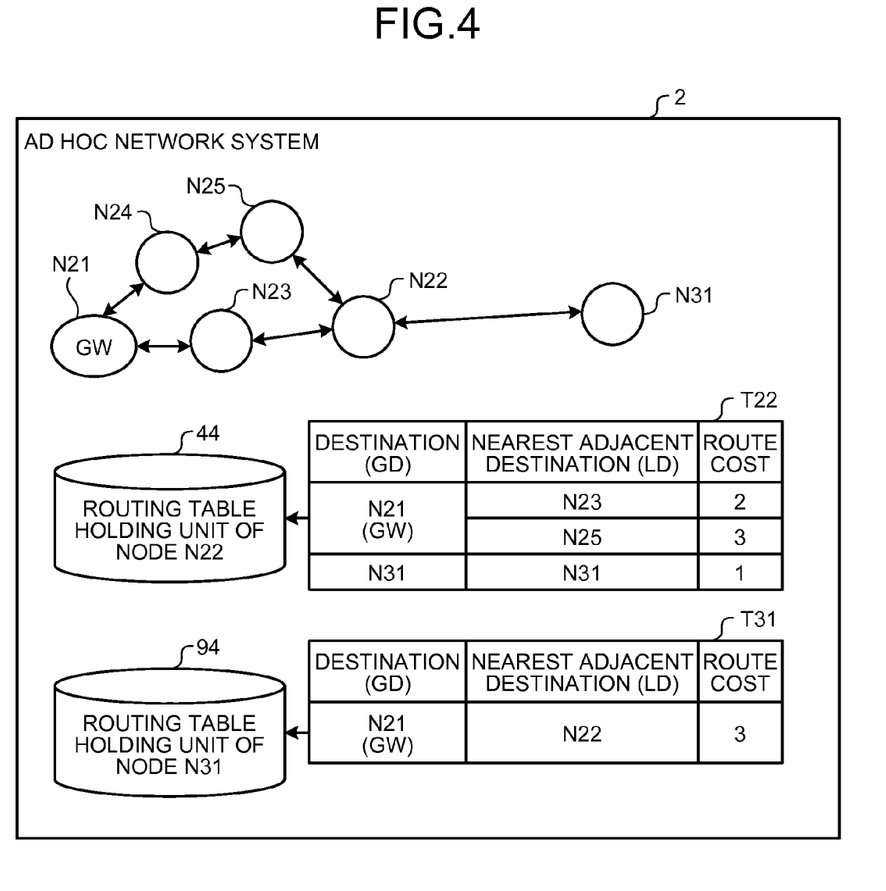
FIG. 4 is a schematic for illustrating a route construction technique in a proactive scheme.

FIG. 4 is a schematic for illustrating a route construction technique in a proactive scheme. As illustrated in FIG. 4, nodes N21 to N25 and N31 each exchange hello frames with an adjacent node thereof to establish a link with the adjacent node. The nodes N21 to N25 and N31 each then exchange topology information based on link information using the hello frames. The nodes N21 to N25 and N31 each then create a routing table based on the exchanged topology information and construct a route to each destination node (global destination (GD)). In the routing table, the identifier of the destination node (N21 and N31, for example) is registered as a "GD" while the identifier of the nearest adjacent destination node (N23, N25, N31, and N22, for example) is registered as a "local destination (LD)". A plurality of nearest adjacent destination nodes may be registered to provide redundancy to the constructed route, for example, "N23" and "N25" for the node N21. During routing, each of the nodes N21 to N25 and N31 refers to the destination (GD) information of a corresponding frame transferred to the node itself and transfers the frame to the destination (LD) serving as the nearest adjacent node.

Figure 5:
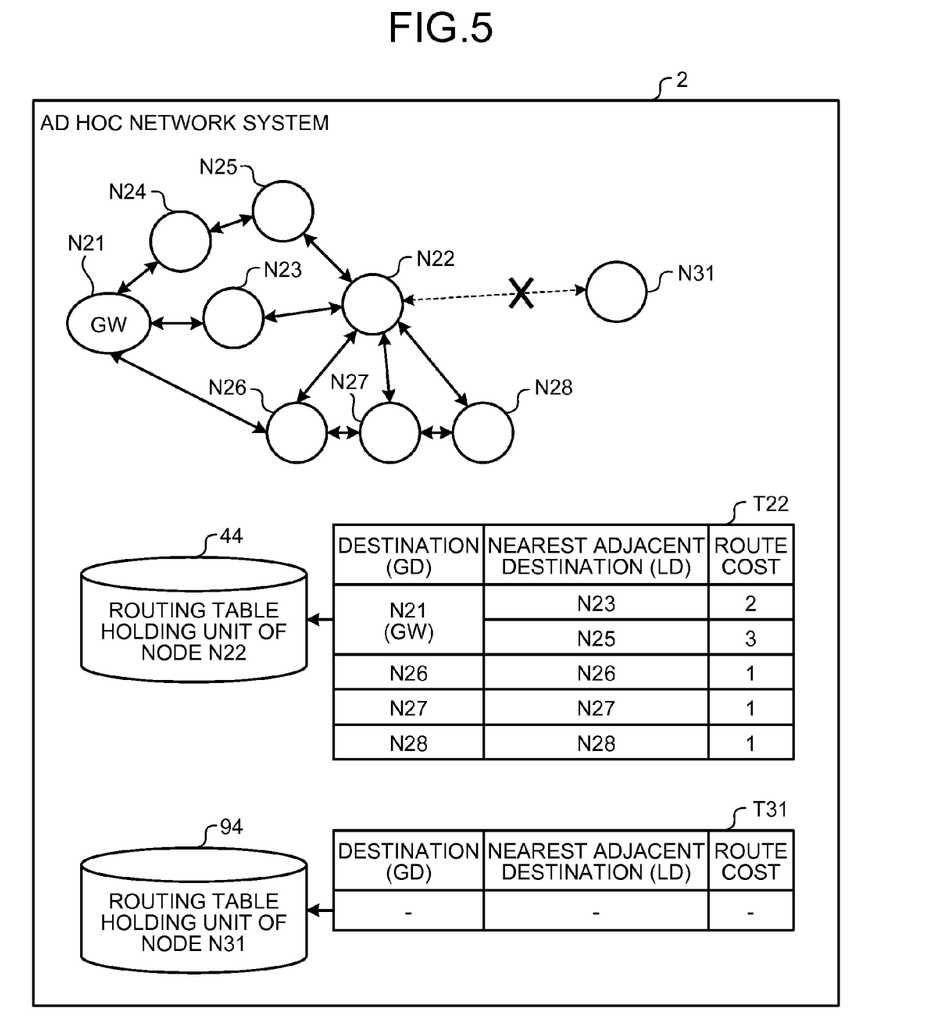
FIG. 5 is a schematic for illustrating an issue in a high density node area.

FIG. 5 is a schematic for illustrating an issue in a high density node area. Although "five nodes" are preset as the upper limit of the number of adjacent nodes to be managed by the node N22, the nodes adjacent to the node N22 are a total of 6 as illustrated in FIG. 5. The number of adjacent nodes to be managed thus exceeds the upper limit. Because of this, although the node N31 installed at a position most distant from the node N22 is an adjacent node by definition, the node N31 is not recognized as the adjacent node of the node N22. As a result, no link is established between the nodes N22 and N31. As described above, topology information is created after a link has been established. The topology information thus excludes the identifiers of the node N31 having no link established with the node N22. The node N31 fails to create a routing table and becomes a node (isolated node) without any route. As a result, it is difficult for the node N31 to join in the ad hoc network and to construct a route toward the gateway node N21 (GD). Furthermore, as illustrated in FIG. 5, a routing table T31 of the node N31 becomes in a state (vacant state) where no data such as route information is stored.

Figure 6:
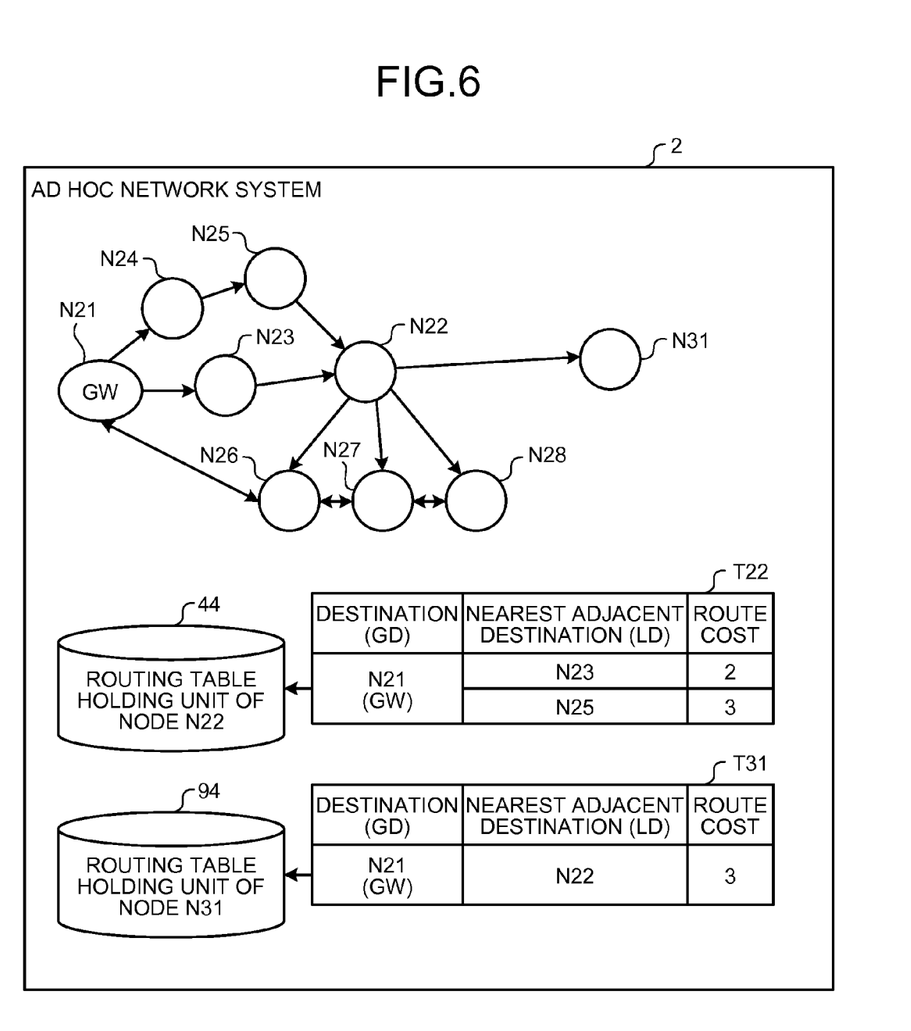
FIG. 6 is a schematic for illustrating a solution to the issue in the high density node area.

FIG. 6 is a schematic for illustrating a solution to the issue in the high density node area. The unestablished link between the nodes N22 and N31 is established by route control according to the embodiment of the present invention. More precisely, the ad hoc network system 2 is a network system that mainly performs regular upstream communication (reports a meter reading result, for example) toward the gateway node N21 as a destination. The ad hoc network system 2 thus specializes in the route construction in the upstream direction. The node N31 establishes a link based only on hello frame reception from the destination direction (the node N22) but not on hello frame exchange. In doing so, the ad hoc network system 2 can establish the link between the node N22 and the node N31 that had been an isolated nod. The successful establishment of the link between the node N31 and the node N22 allows the node N31 to construct a route toward the gateway node N21. In other words, the node N31 narrows down hello frames used for link establishment to hello frames received from the destination (GW) direction. Thus, the routing table T31 of the node N31 stores therein route information where the nearest adjacent node destination (LD) is the node N22, the route is toward the gateway node N21, and the route cost is 3.

Figure 7:
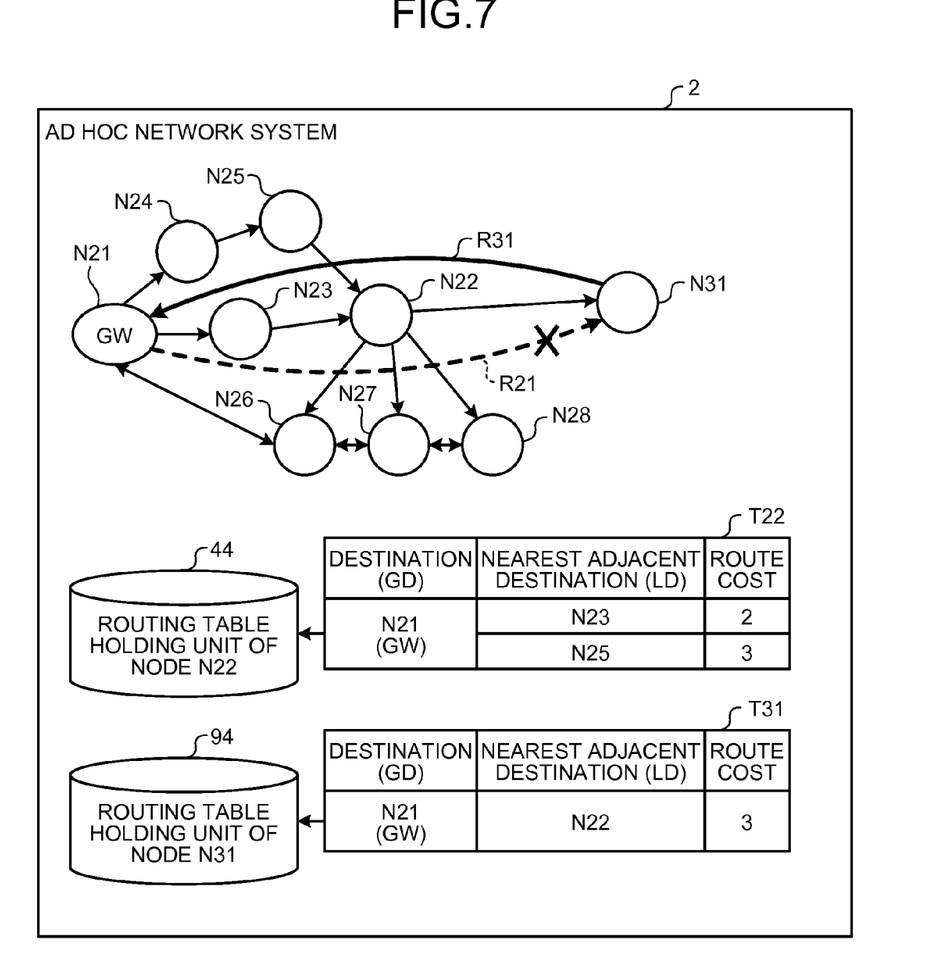
FIG. 7 is a schematic for illustrating the issue that it is difficult for a route in the downstream direction to construct.

However, the aforementioned route control is focused on the solution in the high density node area to establish a link based only on hello reception from the destination direction. This may cause another issue to be described below. FIG. 7 is a schematic for illustrating the issue that it is difficult for the route in the downstream direction to construct. As illustrated in FIG. 7, no topology information for the route construction in the downstream direction is created in a routing table T22 of the node N22, leading to construction of no downstream route. More precisely, the node N31 has established a link based on hello frame reception only from the installation direction of the gateway node N21 (the upstream direction). As a result, although an upstream route R31 can be constructed, it is difficult for a downstream route R21 that is a route in the reverse direction to construct.

Figure 8:
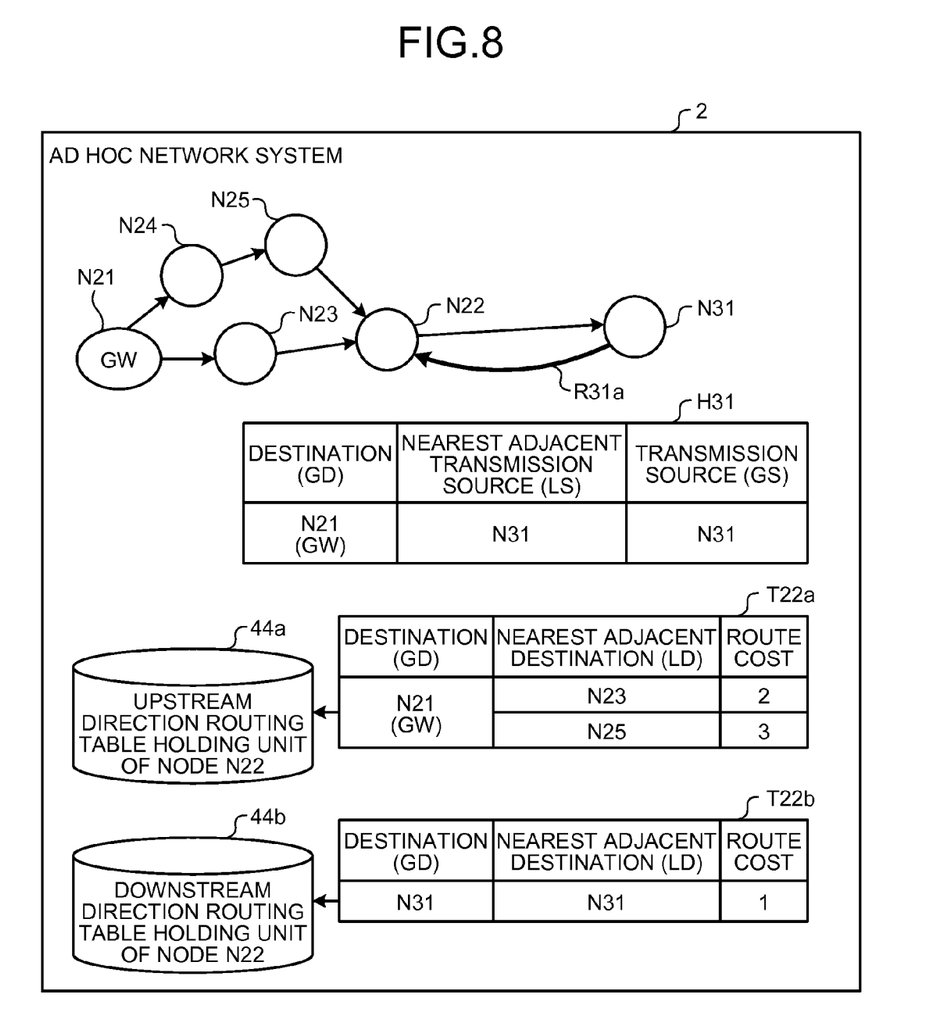
FIG. 8 is a schematic for illustrating a technique to construct a route in the downstream direction.

The ad hoc network system 2 introduces a route construction in the reverse route of the upstream route R31 to complement a downstream route not yet constructed. FIG. 8 is a schematic for illustrating a technique to construct a route in the downstream direction. The node N22 creates a routing table T22b for the downstream direction from a data frame received from the node N31 through an upstream route R31a. More precisely, as illustrated in FIG. 8, "N21" is set as the identifier (GD) of the destination node in a header H31 of the data frame transmitted from the node N31 to the node N22. In addition, "N31" is set as the identifier (local source (LS)) of the nearest adjacent transmission source node, and "N31" is similarly set as the identifier (global source (GS)) of the transmission source node.

Upon receiving an upstream data frame from the node N31, the node N22 extracts "N21" as information on the destination node (GD) and "N31" as information on the transmission source nodes (LS and GS) from the data header H31 that is a header part of this data frame. The node N22 then generates route information for the downstream direction based on the extracted information. The route information for the downstream direction is generated in accordance with, for example, the following correspondence. Specifically, the routing table for the downstream direction is updated so that the information of GD for the downstream route will correspond to the information of GS in the received data header, and that the information of LD in the downstream route will correspond to the information of LS in the received data header. The downstream direction routing table T22b of the node N22 is brought into a data storage state illustrated in FIG. 8 when the upstream data frame is received from the node N31. More precisely, the table stores therein information including "N31" as the destination node "GD", "N31" as the nearest adjacent destination node "LD", and "1" hop as the "route cost". As a result, the node N22 can construct the downstream route toward the node N31 by referring to the downstream direction routing table T22b.

The other nodes N23 to N25 as well as the gateway node N21 can also construct routes in the downstream direction by transferring data frames in sequence in a technique similar to the aforementioned technique used for the node N22.

Figure 9:
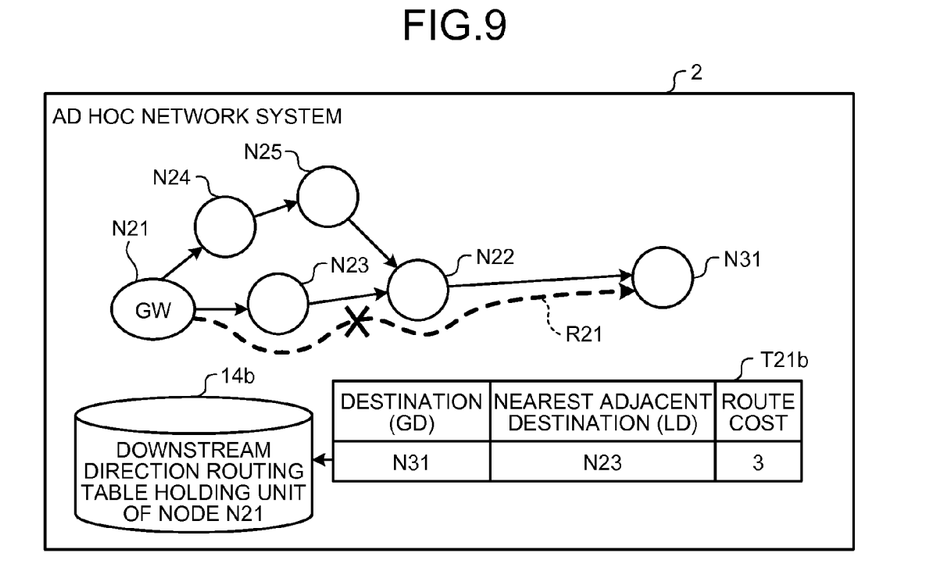
FIG. 9 is a schematic for illustrating an issue in the construction of a downstream route using the reverse route of an upstream route.

FIG. 9 is a schematic for illustrating an issue in the construction of a downstream route using the reverse route of an upstream route. As illustrated in FIG. 9, the gateway node N21 constructs the downstream route R21 using a downstream direction routing table T21b created upon frame reception in the upstream direction. This allows the gateway node N21 to perform downstream communication toward the node N31 upon the frame reception from the node N31. However, no update is performed on the information of the downstream route R21 after the creation of the downstream route R21 in the frame transfer in the upstream direction. The link quality of a part or the whole of the downstream route R21 varies in the medium term due to temporal appearance of shields or other reasons. This prevents the downstream route R21 that has not been updated from flexibly responding to quality deterioration of a link (the link between the nodes N23 and N22, for example). As a result, the gateway node N21 may transfer a frame through the route R21 that is incapable of communication. Specifically, communication (frame transfer) in the downstream route without a redundant route may be failed and may cause packet loss.

The cause of such an issue is that the target quality of a link selected as an upstream route differs from the target quality of a link selected as a downstream route. The upstream route with redundancy is constructed based on a link quality evaluation using hello frames. This route is constructed using a link whose quality can be averagely assured at a certain level for the purpose of increasing the arrival rate of a large number of regular upstream communication frames. In contrast, a non-redundant downstream route needs to be constructed using a link whose latest link quality is high in order to increase the chance of arrival of a small number of irregular downstream communication frames with a low frequency. Referring back to FIG. 3, the difference is illustrated between the quality of a link suitable for the upstream route and the quality of a link suitable for the downstream route. The horizontal axis indicates time while the vertical axis indicates quality. A broken line $Q_1$ indicates the lowest quality requested for successful communication. A link that can averagely assure a certain level of quality as indicated by a solid line L1 is suitable for the upstream route. In contrast, links whose latest quality is high as indicated by solid lines L2 and L3 are suitable for the downstream route even though the quality largely varies with time.

In the upstream direction route, the link quality is regularly evaluated through the aforementioned hello frame reception, and the evaluation result of route quality (route evaluation result) is also updated on a regular basis with a predetermined frequency. Furthermore, the upstream direction route includes a redundant route, and thus, even when frame transfer is failed, the chance of arrival of the frame is maintained using the other alternative route.

Figure 10:
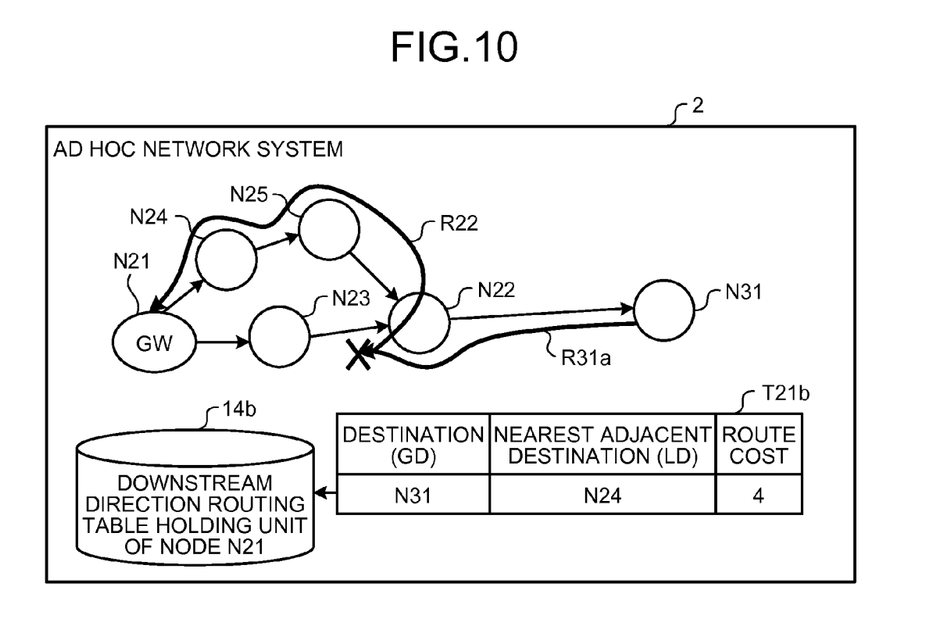
FIG. 10 is a schematic illustrating a state where the route quality in the downstream direction is updated in response to regular upstream communication.

FIG. 10 is a schematic illustrating a state where the route quality in the downstream direction is updated in response to regular upstream communication. As illustrated in FIG. 10, upon failure of frame transfer between the nodes N23 and N22, an upstream frame from the node N31 is diverted at the node N22 and then passes through an alternative route R22 to be transferred to the gateway node N21 serving as the destination node. The gateway node N21 receives, from the node N24, the frame from the node N31 that has passed through the routes R31a and R22 and updates the downstream direction routing table T21b. More precisely, in the downstream direction routing table T21b, the nearest adjacent destination node (LD) is updated from prior "N23" to "N24" as illustrated in FIG. 10 in response to the diversion of the frame transfer route. The route cost until the arrival of the frame is also updated from the prior hop number of "3" to "4". A downstream direction routing table holding unit 14b holds the updated downstream direction routing table T21b.

As described above, because the upstream communication from the node N31 to the gateway node N21 is performed on a regular basis, the ad hoc network system 2 can update the route quality information without observation of the link quality using hello frames. In other words, the downstream route from the gateway node N21 includes no alternative route, whereas the upstream route includes an alternative route because the upstream route is constructed upon hello frame reception. The downstream route can be thus updated based on the diversion action of the upstream route immediately before the construction of the downstream route. This allows the most recent route quality to be reflected in the downstream route. Particularly when the frequency of communication in the upstream direction is high enough to follow variation in the link quality, the ad hoc network system 2 can achieve a high frame arrival rate even in the downstream communication.

The occurrence frequency of the upstream communication toward the gateway node N21 as a specific destination node significantly may differ from the occurrence frequency of the downstream communication that is communication in the reverse direction. In such a case, when route construction is performed by bidirectional hello frame exchange (in not only the upstream direction but also the downstream direction), a difference in route priority is eliminated. More precisely, the difference in priority is not considered between a route that is hardly used (the route between the nodes N22 and N26, the route between the nodes N22 and N27, and the route between the nodes N22 and N28 as illustrated in FIG. 6, for example) and a route that is frequently used (the route between the nodes N22 and N31 as illustrated in FIG. 6, for example). This causes a disadvantage where no important route (the route between the nodes N22 and N31, for example) is constructed in the upstream direction in a memory-efficient platform. To avoid such a disadvantage, the ad hoc network system 2 is focused only on hello frame reception from the destination direction to construct a route toward a gateway node serving as a specific destination node. This enables important route construction in the upstream direction.

On the contrary, however, the aforementioned route construction method has a disadvantage in that no downstream route is constructed. Even when the disadvantage is solved by the route construction using the route reverse to the upstream route, redundancy of the downstream route is lost, and the downstream route is weakened against variation in the link quality. This results in deterioration of the arrival rate of frames. To solve these disadvantages, the ad hoc network system 2 according to the embodiment of the present invention performs the upstream communication with higher frequency than that of the variation in the link quality, thereby updating the downstream route on a regular basis to the most recent state and increasing the frame arrival rate. Accordingly, the ad hoc network system 2 can minimize route search processing that occurs after the failure of downstream communication in the route reverse to the upstream direction. This can reduce a processing load and processing time in the system.

As described above, the ad hoc network system 1 includes the gateway node 10 and the nodes 20 to 80 that are installed at fixed positions and perform ad hoc wireless communication with the gateway node 10. For example, the node 20 includes the link quality evaluating unit 22 and the communicating unit 21. The link quality evaluating unit 22 evaluates link quality using hello frames based only on the track record of reception of the hello frames in order to form a network for upstream communication toward the gateway node 10. The communicating unit 21 performs the upstream communication toward the gateway node 10 on a regular basis with a predetermined frequency. The gateway node 10 and the nodes 20 to 80 each include the downstream route constructing unit 12 or the downstream route constructing unit 25. The downstream route constructing unit 12 and the downstream route constructing unit 25 construct routes through which downstream communication is performed from the gateway node 10 to the nodes 20 to 80 based on the track record of frame transfer from the nodes 20 to 80. For example, the downstream route constructing unit 12 and the downstream route constructing unit 25 select routes with the most recent arrival track records, that is, the most recent routes out of routes with arrival track records, as downstream routes. This allows a downstream route construction that provides a higher arrival rate.

In particular, immediately after a frame in the upstream direction has arrived at the gateway node 10, variation in the communication quality of the arrival route is small. It is presumed that the arrival rate in the downstream direction is similarly high. The gateway node 10 then selects the same route as has been used in the upstream communication also in the transmission of a frame in the downstream direction, whereby the frame can arrive at the destination node through the route with favorable quality. This allows efficient downstream communication using the route established in the upstream direction.

In the ad hoc network system 1, when the reactive route constructing unit 13 of the gateway node 10 fails downstream communication through the route based on the track record of the transfer of the frame, the reactive route constructing unit 13 constructs a redundant route using a route search frame (RREQ/RREP) similarly to the typical reactive scheme. This achieves the arrival rate of the downstream communication as high as that of the upstream communication.

In the ad hoc network system 1, the gateway node 10 and the nodes 20 to 80 update the downstream route based on the track record of the most recent transfers, which is updated in response to the route diversion of frames transferred on the regular basis in the upstream communication from each of the nodes 20 to 80 to the gateway node 10. The route construction performed after the failure of the downstream communication is similar to the route construction in a reactive scheme. However, the gateway node 10 preferentially reuses the downstream route constructed based on the track record of the transfer. As a result, the number of performed route searches is reduced as compared with the route search always performed by the gateway node 10 itself. This can reduce traffic for the route search. In the above described manner, downstream route communication in which traffic for a route search is reduced becomes possible in accordance with changes in the network environment.

More specifically, the ad hoc network system 1 performs downstream route construction at two stages. In the first stage, the gateway node 10 and the nodes 20 to 80 construct a non-redundant downstream route including only LD1 in which LS is employed as LD during the transfer of upstream data. Only when routing using the route is failed, the gateway node 10 performs, as the second stage, a general route search and performs route construction keeping a redundant route. This suppresses generation of a route search frame as generated in a reactive scheme. This enables a construction of a network system in which the frame arrival rate is maintained while an increase in traffic is suppressed.

In the embodiment of the present invention, the number of hops is exemplified as the route cost, but this is not a limiting example. For example, the route cost may employ information about utilization of wireless resources in the ad hock network, obtained by converting the link quality included in the number of hops and the route into utilization of a radio link. For example, metric such as the received signal strength indication (RSSI) can also be used. Besides these, the route cost may employ, for example, information about a link state such as the frame error rate (FER) and the signal-to-interference and noise power ratio (SINR).

In the embodiment of the present invention, failing to construct a route based on the track record of frame transfer, the reactive route constructing unit 13 of the gateway node 10 constructs a route using a route request frame. However, without limitation to the embodiment, when the downstream communication is failed, the second most recent route next to the most recent route among routes with track records of arrival may be selected for retransmission. Furthermore, when the retransmission through the second most recent route is also failed, the third most recent or more previous route may be selected for retransmission in order. This may reduce congestions due to an increase in traffic and reduce a load on the node as compared with a route construction using a route request frame for retransmission.

The components of each node described above are not necessarily physically configured as illustrated in the drawings. Specifically, specific embodiments of the distribution and the integration of each of the devices are not limited to those in the drawings. The whole or a part of them may be distributed or integrated functionally or physically in arbitrary units depending on, for example, various types of loads and usage conditions. For example, the communicating unit 11 and the downstream route constructing unit 12 of the gateway node 10 or the downstream route constructing unit 25 and the routing table holding unit 27 of the node 20 may be integrated as a single component. On the contrary, for example, the communicating unit 21 of the node 20 may be distributed into a part that transmits and receives hello frames to perform communication in the upstream direction and a part that transmits RREQs/RREPs to perform communication in the downstream direction. Furthermore, the storage device 10c may be connected as an external device of the node 10 via a network or a cable.

An embodiment of the communication system disclosed in the present application enables a route to be efficiently constructed with reduced amount of memory usage.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication system comprising:
   a specific node; and
   a plurality of nodes configured to be installed at fixed positions and perform ad hoc wireless communication with the specific node, wherein
   each of the nodes include first processer that executes a first process including:
      performing route evaluation using a hello frame based only on a track record of reception of the hello frame in order to perform upstream communication toward the specific node to form a network,
      constructing an upstream route based on the route evaluation,
      performing upstream communication toward the specific node on a regular basis with a predetermined frequency, and
      constructing a downstream route from the specific node based on a route in the upstream communication toward the specific node, and
   the specific node includes a second processor that executes a second process including:
      updating the downstream route based on a track record of the most recent transfers, which is updated in response to a route diversion of frames transferred on the regular basis in the upstream communication from each of the plurality of nodes to the specific node; and
      preferentially reusing the downstream route constructed based on the track record of the most recent transfers.

2. The communication system according to claim 1, wherein the second process further includes constructing a route using a route request frame when downstream communication through the downstream route constructed in the first process is failed.

3. A communication method for a plurality of nodes included in a communication system including a specific node, and a plurality of nodes that are installed at fixed positions and perform ad hoc wireless communication with the specific node, the communication method comprising:
   performing route evaluation using a hello frame based only on a track record of reception of the hello frame in order to perform upstream communication toward the specific node to form a network and constructing an upstream route, by each of the plurality of nodes;
   performing upstream communication toward the specific node on a regular basis with a predetermined frequency, by each of the plurality of nodes;
   constructing a downstream route from the specific node based on a route in the upstream communication toward the specific node, by each of the plurality of nodes;
   updating the downstream route based on a track record of the most recent transfers, which is updated in response to a route diversion of frames transferred on the regular basis in the upstream communication from the each of the plurality of nodes to the specific node, by the specific node; and
   preferentially reusing the downstream route constructed based on the track record of the most recent transfers, by the specific node.

* * * * *